Dec. 31, 1968 B. GERSTEIN 3,419,749
CONVERGENCE CIRCUIT
Filed Nov. 29, 1966
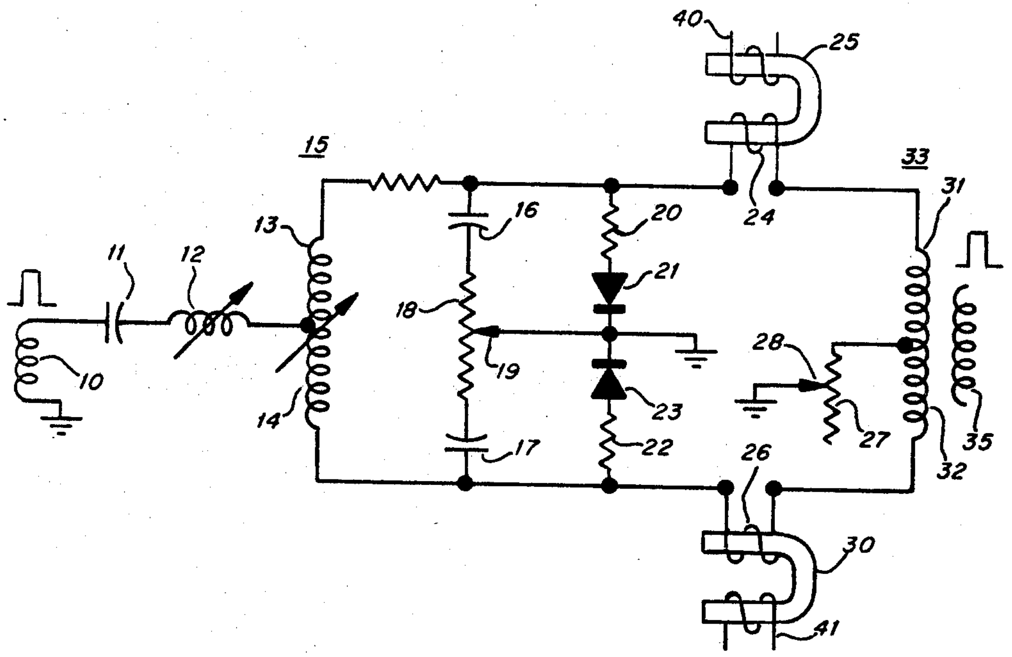
INVENTOR.
Bernard Gerstein
BY Nicholas A Camasto
ATTY.

United States Patent Office 3,419,749

Patented Dec. 31, 1968

3,419,749

CONVERGENCE CIRCUIT

Bernard Gerstein, Hoffman Estates, Ill., assignor to Admiral Corporation, Chicago, Ill., a corporation of Delaware Filed Nov. 29, 1966, Ser. No. 597,745
4 Claims. (Cl. 315—13)

ABSTRACT OF THE DISCLOSURE

A red-green dynamic convergence network where the Left Side-Vertical Line resistance control is relocated to the series connection between the red and green pole piece horizontal windings.

My invention relates in general to color television receivers and in particular to the red-green convergence arrangement in such receivers.

As is well known, the common three gun, aperture mask, cathode ray picture tube used in color receivers imposes special convergence problems to insure proper registration of the electron beams with their corresponding color phosphors on the screen. These corrections are generally performed by supplying properly shaped dynamic convergence currents to separate convergence magnet assemblies appropriately disposed about the picture tube neck. (Center convergence is usually attained by adjustable permanent magnets.) In general, substantially parabolic currents are required in the convergence windings to produce good convergence throughout scanning of the screen.

Continuing effort has centered about simplifying the task of a serviceman or technician in properly "setting up" or converging a color television receiver picture tube. In the past, considerable difficulty was encountered since the convergence controls were largely interdependent and adjustment of one control would necessitate readjustments of other controls. Over the years, numerous improvements have been made in the convergence circuitry which have led to a much greater degree of independence between controls with consequent simplification. The problems of convergence are, however, quite complex and even the modern circuits are difficult of adjustment for optimum convergence. These complex circuits do not lend themselves to simple analysis, and most circuit descriptions tend to be empirical rather than analytical.

Generally speaking, dynamic convergence currents are developed by double integration of pulses of voltage at the line scanning frequency. This double integration process yields substantially parabolically shaped currents which, as mentioned previously, tend to approximate the necessary corrections throughout the screen. Controls are provided for increasing or decreasing the amplitude of the parabolic current and some form of clamping is provided to maintain the parabolic wave form at a fixed point of potential corresponding to the center of the picture tube screen. This latter feature has greatly reduced the problem of center convergence shift when adjusting the controls. To provide for variation in potential from one side of the screen to the other, a form of tilting is employed. In general, a tilt current is sawtooth shaped and effectively skews the parabolic current. By combining parabolic and sawtooth currents, it is feasible to achieve substantially independent left and right side control such that the technician has a minimum of difficulty in converging the set.

Typical examples of common convergence circuits in use today are disclosed in U.S. Patents No. 3,163,797 to G. W. Singleback and No. 2,903,622 to J. C. Schopp. The Singleback patent refers to the controls as master amplitude and tilt and differential amplitude and tilt whereas the Schopp patent uses the more descriptive nomenclature of left and right side vertical and horizontal lines. Both patents show substantially identical horizontal red-green convergence circuits, however, and the reader is referred to these patents for a detailed theory of operation of the circuit.

These circuits are in extensive use today and are adequate for their purposes. Yet, I have discovered that a very simple change has produced a great improvement in the degree of isolation between control adjustments, notably between the left and right side vertical line adjustments, which has led to a marked simplification in setup.

Accordingly, the primary object of my invention is to provide a red-green convergence control network which displays greater independence of control functions than any heretofore known network.

Another object of my invention is to provide an improved red-green convergence network which is easily obtained by merely relocating a control element of a prior art circuit.

In the figure, a rudimentary schematic diagram of my improved red-green convergence control network is shown. It will be understood by those skilled in the art that the drawing depicts a very small portion of a complete color television receiver and, indeed, only a portion of the complete convergence control network for such a color television receiver. However, the omitted parts are standard, and it will be deemed obvious by those skilled in the art to incorporate the disclosed circuit in any conventional three gun television receiver.

Referring specifically to the drawing, winding 10 is shown as a source of recurrent pulse voltage. Winding 10 generally comprises a winding on the horizontal output transformer of a conventional television receiver, and consequently, its pulse potential has a frequency corresponding to the line horizontal scanning rate of 15,750 Hz. One end of winding 10 is grounded and the other end connected through a series combination of capacitor 11 and variable inductor 12. This variable inductor is called the "Right Side Vertical Lines" control in the schopp patent. A split variable inductor 15 has a midportion connected to inductor 12 such that separate inductive elements 13 and 14 are formed thereby. The inductance is variable and is called a "Right Side Horizontal Lines" control in Schopp. A variable RC network is connected across inductor 15 and consists of a pair of capacitors 16 and 17 serially connected with a resistor 18. Resistor 18 has a movable tap 19 which is connected to ground. Schopp labels this control (ungrounded however) as "Left Side Horizontal Lines." Across each extremity of inductor 15 is a clamping network consisting, respectively, of resistor 20 and diode 21, and resistor 22 and diode 23, which function to maintain the troughs of the substantially parabolic current developed at a fixed potential.

A pair of magnet pole pieces 25 and 30 are shown. In practice, three of these are symmetrically arranged about the neck of the picture tube and cooperate with structure therein for effectively producing auxiliary magnetic fields respectively controlling the three different electron beams. The auxiliary control effects of these pole pieces are produced by currents flowing through windings thereon. For example, pole piece 25 has a winding 24 and a winding 40 thereon, and pole piece 30 has a winding 26 and a winding 41 thereon. Windings 24 and 26 are connected to the extremities of inductor 15, respectively, and will thus be seen to have convergence currents of horizontal scanning frequency developed therein. Windings 40 and 41 may be connected to sources of convergence currents of vertical line frequency in accordance with any of the well known circuits in the art. The other terminals of windings 24 and 26 are connected to an auxiliary source of pulse voltage. This auxiliary source of pulse voltage includes a winding 35, subjected to voltage pulses at the horizontal line scanning rate, inductively coupled to a winding 33 having a tap substantially bifurcating it into two inductive portions 31 and 32. A resistance 27 with a grounded movable contact 28 is connected to the tap on winding 33.

A close scrutiny of the Singleback patent discloses that the only structural difference is in the location of resistance 27. This connection is also disclosed in the Schopp patent where the resistance is labeled Left Side Vertical Lines. Further, in all extant convergence networks known to me, this control is so situated.

I have discovered that the simple expedient of relocating this control to the position shown in the drawing has given rise to a remarkable improvement in convergence setup, especially in the degree of isolation displayed by the various controls. Heretofore, adjustment of the Left Side Vertical Lines control invariably caused substantial changes on the right side of the picture tube, and consequently, it was necessary to alternately adjust the left and right controls and considerable skill was demanded of the technician. With my circuit, this is no longer true, and convergence setup is greatly facilitated. Further, the advantages of my circuit are achieved without any additional cost or component parts.

While the specific reasons why the relocation of this control should give rise to such improved results are not clear, it may be surmised that the control, in its new location, does not substantially affect the tilt voltage (and consequently, the ratio of the parabolic currents flowing in the respective pole piece windings), whereas in prior art circuits, adjustment of this control apparently did affect the ratio. However, while the theory underlying my discovery is not clear, there is no doubt that my circuit yields greatly improved convergence results which have been borne out by extensive use in the field.

What has been described is a modified red-green horizontal convergence circuit which exhibits a marked improvement in isolation of control functions over circuits of the prior art. The scope of my invention is to be determined only by reference to the claims.

The embodiments of the invention in which an exclusive property or privilege is claimed are defined as follows:

1. In a color television receiver including a three gun, aperture mask picture tube requiring variable magnetic fields for converging the three electron beams throughout scanning thereof; a red beam convergence pole piece and a green beam convergence pole piece each including a two terminal winding; network means interconnecting said windings at one terminal respectively; first inductive means applying a pulse voltage of line scanning frequency to said network means; said network means deriving phase and amplitude controlled currents of substantially parabolic shape for said windings, and including a first adjustment element for varying the ratio of said parabolic currents flowing through said coils; and a second adjustment element connected to the other respective terminals of said windings for varying the amplitude of said parabolic currents.

2. In a color television receiver as set forth in claim 1 wherein there is further provided second inductive means supplying a pulse voltage in phase with said first pulse voltage and wherein said second adjustment element is connected intermediate said second inductive means.

3. In a color television receiver as set forth in claim 2 wherein both said first adjustment element and said second adjustment element comprise variable resistances.

4. In a color television convergence circuit of the type including a combined red-green network having a first source of pulse voltage coupled to tapped inductive means for applying opposite polarity voltages to the respective red and green convergence pole piece windings, an RC network including a first variable resistance coupled across one end, respectively, of said windings for apportioning voltage therebetween, a second variable resistance coupled between the movable tap on said first variable resistance and ground, clamping means for maintaining a fixed minimum level potential across said windings and an inductive source of opposite polarity pulse voltages coupled across the other end, respectively, of said windings; the improvement comprising grounding the tap on said first variable resistance and connecting said second variable resistance between a point intermediate said inductive source of pulse voltage and ground.

References Cited

UNITED STATES PATENTS

| | | | |
|---|---|---|---|
| 2,903,622 | 9/1959 | Schopp. | |
| 3,141,109 | 7/1964 | Chandler ------------ | 315—22 |
| 3,163,797 | 12/1964 | Singleback ----------- | 315—22 |

RODNEY D. BENNETT, *Primary Examiner.*

MALCOLM F. HUBLER, *Assistant Examiner.*